United States Patent
Specht

(10) Patent No.: US 6,722,212 B2
(45) Date of Patent: Apr. 20, 2004

(54) DEVICE FOR MEASURING TENSILE STRESS ON A SEAT BELT

(75) Inventor: Martin Specht, Feldafing (DE)

(73) Assignee: Breed Automotive Technology, Inc., Lakeland, FL (US)

(*) Notice: Subject to any disclaimer, the term of this patent is extended or adjusted under 35 U.S.C. 154(b) by 0 days.

(21) Appl. No.: 10/313,040

(22) Filed: Dec. 6, 2002

(65) Prior Publication Data

US 2003/0172748 A1 Sep. 18, 2003

(30) Foreign Application Priority Data

Mar. 15, 2002 (DE) .......................... 102 11 564

(51) Int. Cl.[7] ................................ G01L 5/00
(52) U.S. Cl. ............ 73/862.381; 280/801; 73/862.39; 73/1; 24/633; 24/637
(58) Field of Search ............. 280/801; 24/633, 24/637; 73/862.381, 862.391, 862.41–862.44, 862.451–862.454, 862.46, 862.471–862.474, 862.392, 862.393, 862.07

(56) References Cited

U.S. PATENT DOCUMENTS

| | | | | |
|---|---|---|---|---|
| 4,925,212 A | * | 5/1990 | Motozawa | 280/807 |
| 5,129,679 A | * | 7/1992 | Specht et al. | 280/806 |
| 6,081,759 A | | 6/2000 | Husby et al. | 701/45 |
| 6,202,269 B1 | | 3/2001 | Specht et al. | 24/641 |
| 6,209,915 B1 | * | 4/2001 | Blakesley | 280/801.1 |
| 6,230,088 B1 | * | 5/2001 | Husby | 701/45 |
| 6,266,855 B1 | | 7/2001 | Specht et al. | 24/633 |
| 6,450,534 B1 | * | 9/2002 | Blakesley et al. | 280/801.1 |
| 6,578,432 B2 | * | 6/2003 | Blakesley et al. | 73/826 |

* cited by examiner

*Primary Examiner*—Edward Lefkowitz
*Assistant Examiner*—Alandra Ellington
(74) *Attorney, Agent, or Firm*—Lonnie Drayer

(57) ABSTRACT

A device for measuring tensile stress acting on a vehicle seat belt has two components. A first component is connected with a seat belt and a second component is fixed to a vehicle part a spring arranged between the two components, against whose force the two components may be moved relative to one another. A transducer has transducer elements that are attached to the two components and produces an electrical signal as a function of the positions of the two components relative to one another. The transducer produces a switching signal when the components are in a first positional zone. In a second positional zone, in which the two components may be moved relative to one another against the force of the spring, the transducer produces measuring signals proportional to the movement of the two components relative to one another.

9 Claims, 2 Drawing Sheets

DEVICE FOR MEASURING TENSILE STRESS ON A SEAT BELT

FIELD OF THE INVENTION

The present invention relates to a device for measuring tensile stress acting on a seat belt.

DISCUSSION OF THE PRIOR ART

U.S. Pat. No. 6,081,759 teaches a device for measuring tensile stress that comprises two components. A first component is connected with the seat belt and is supported via a spring on a second component connected firmly to the vehicle as an end fitting. The first component is mounted so as to be movable against the force of the spring relative to the second component fixed to the vehicle as a result of a tensile force acting on the seat belt. This movement is detected by a transducer that generates an electrical measuring signal proportional to the movement and thus to the tensile force acting on the belt webbing. The transducer takes the form of a GMR (Giant magneto-resistive) sensor.

SUMMARY OF THE PRESENT INVENTION

There is provided in accordance with the present invention a device for measuring tensile stress acting on a vehicle seat belt, comprising: (a) a first component that may be connected with the seat belt; (b) a second component that may be fixed to a structural component of a vehicle; (c) a spring arranged between the two components and against whose force the two components may be moved relative to one another; and (d) a transducer having transducer elements that are attached to the first and second components and produces electrical signals as a function of the positions of the first and second components relative to one another, wherein the transducer produces a switching signal when the components are in a first positional zone; and in a second positional zone, in which the two components may be moved relative to one another against the force of the spring, the transducer produces measuring signals proportional to the movement of the two components relative to one another.

DETAILED DESCRIPTION OF THE INVENTION

In a device according to the present invention a transducer produces a first switching signal when the components are in a first positional zone and produces electrical measuring signals in a different second positional zone. When the two components are moved relative to one another against a spring force, the electrical measuring signals are proportional to the movement or positioning of the two components relative to one another.

Figure 1:
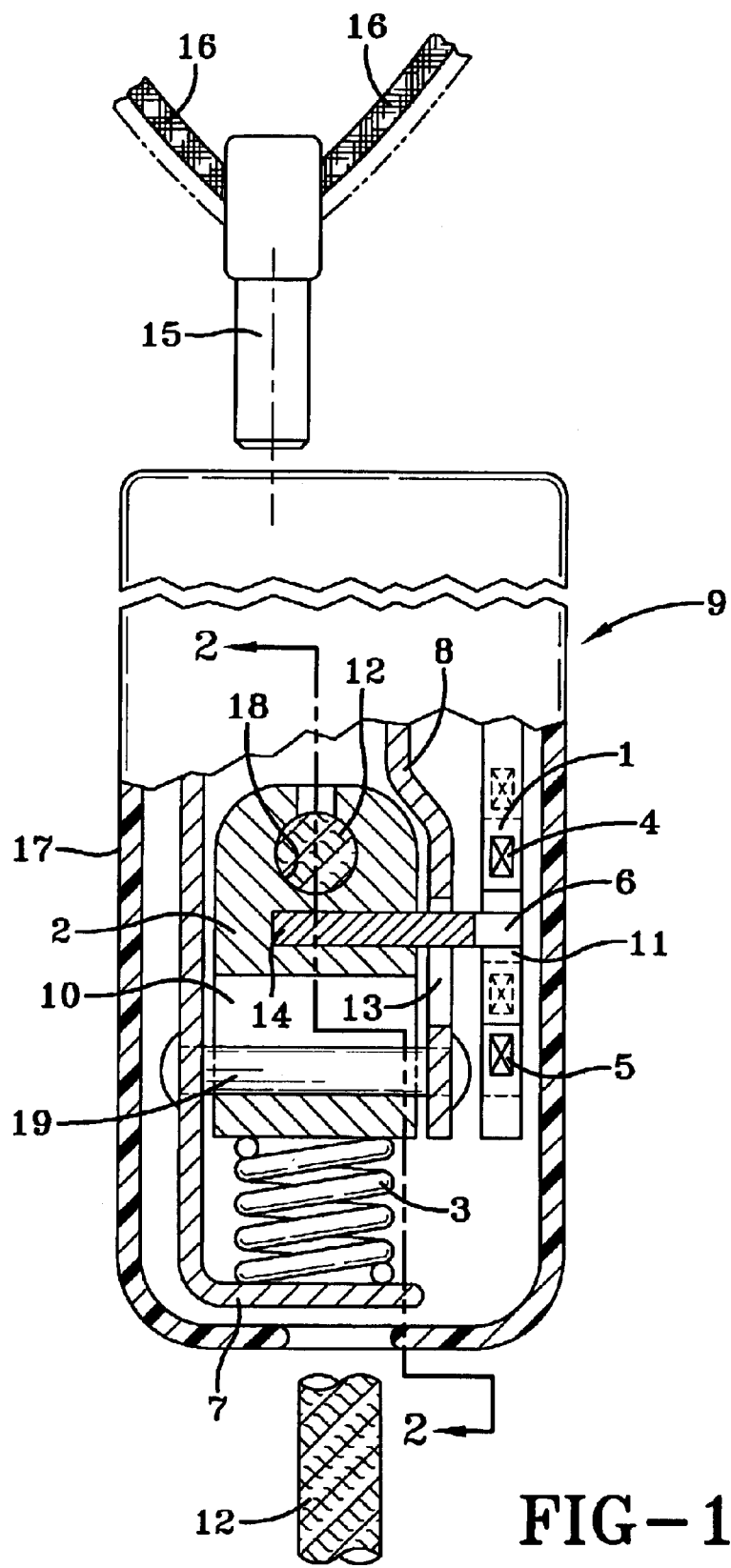
FIG. 1 is a schematic sectional representation.
Figure 2:
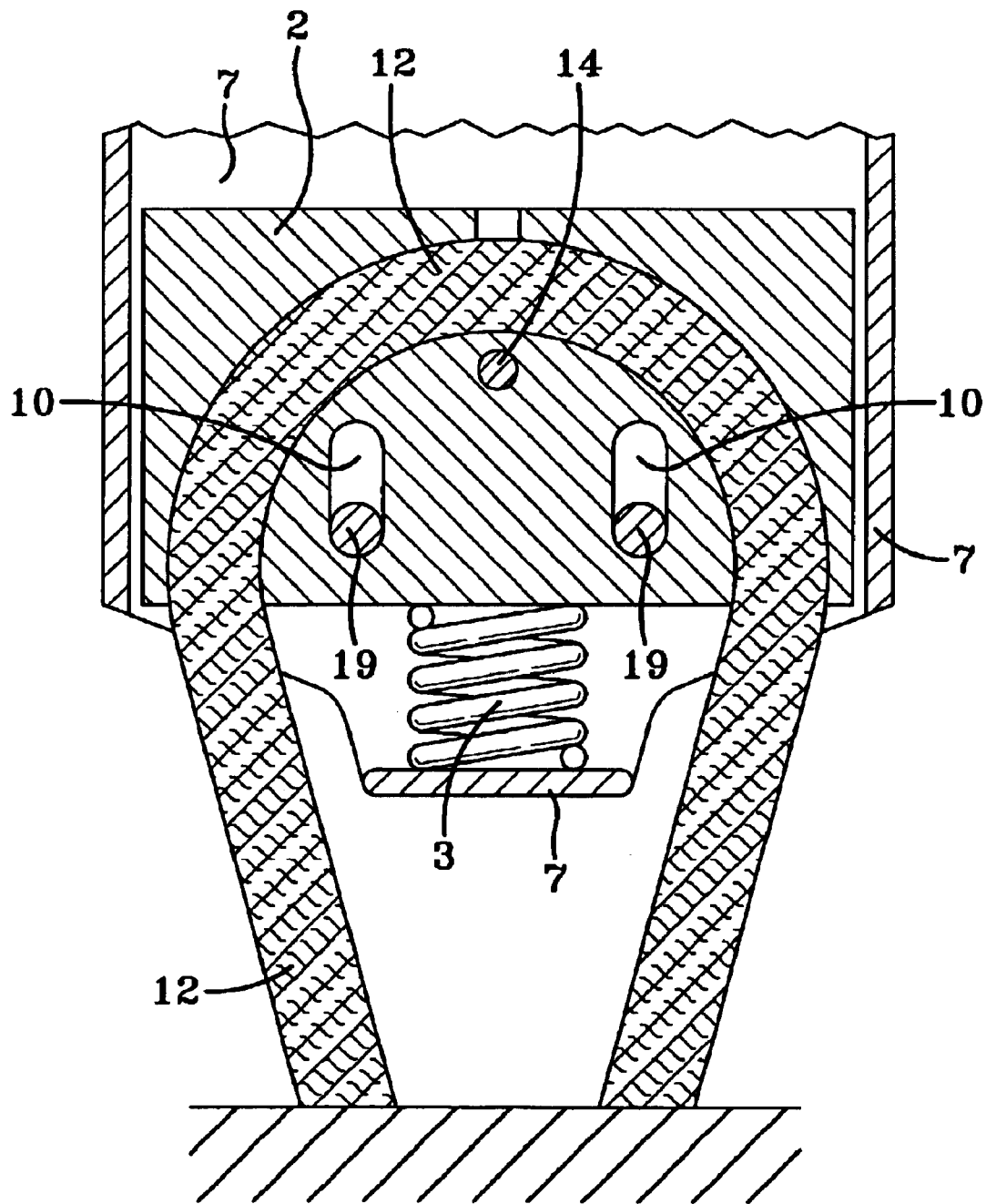
FIG. 2 is a view along section line 2—2 in FIG. 1.

The exemplary embodiment shown in FIGS. 1 and 2 is installed in the buckle 9 of a seat belt. The exemplary embodiment comprises a first component 1, which is in one piece or firmly connected with the ejector of the buckle 9 or with a rod-shaped linear guide for a spring, as is known from U.S. Pat. No. 6,266,855 B1. The first component is preferably a structural element provided in the belt buckle and fulfilling a particular function in the belt buckle, which structural element is moved upon insertion into the buckle of the plug-in tongue connected with the seat belt and upon removal of the plug-in tongue out of the buckle. It may, for example, be the ejector or a spring-loaded mandrel, which serves in linear guidance of a spring acting on a pin-type securing element, as known from U.S. Pat. No. 6,202,269 B1. However, the first component 1 may also be connected with another structural part of the belt buckle 9 which also moves upon insertion of a plug-in tongue 15 connected with a webbing part 16 of the seat belt and upon removal of this plug-in tongue 15 from the belt buckle 9.

In addition, the exemplary embodiment comprises a second component 2. This second component 2 is an anchoring shoe arranged between two rigid plates 7, 8, formed for example of metal, belonging to the belt buckle frame. The second component 2 is supported relative to the belt buckle 9 or the belt buckle frame by a spring 3. The spring 3 preferably is a helical compression spring. In the exemplary embodiment illustrated, the spring 3 is located between the plate 7 fixed in a belt buckle housing 17 and belonging to the buckle frame and the second component 2 forming an anchoring shoe.

The second component 2 is connected firmly to a vehicle part, not shown in any more detail, for example with the vehicle floor or a seat slide or another vehicle part suitable for anchoring the belt buckle 9. In the exemplary embodiment fixed connection is made by an anchoring cable 12, which is looped about the second component 2. In the loop area, the anchoring cable 12 may preferably be arranged in a recess 18 in the second component 2 wholly or partially surrounding the cross section of the cable. The belt buckle 9 is attached to the vehicle structure by the anchoring cable 12.

The second component 2 is mounted in the belt buckle 9 so as to be displaceable between the two plates 7, 8 in the longitudinal direction of the belt buckle (vertically in FIGS. 1 and 2). To guide the movement of the second component 2, there are provided two guide pins 19, which are attached to the two plates 7, 8. The two guide pins 19 project through elongated holes 10 in the second component 2. Vertical parallel guidance of the second component 2 on the belt buckle frame or on the two plates 7, 8, which are arranged in the belt buckle 9 by being fixed to the housing is thereby achieved.

The second component 2 is forced into the rest position illustrated in FIGS. 1 and 2 (top position) by the force of the spring 3. The guide pins 19 then lie against the lower defining edges of the elongate holes 10.

Transducer elements are provided on the two components 1, 2 to form a transducer. On the first component 1 there are located transducer elements 4, 5 which preferably are permanent magnets. A sensor, in particular a galvanomagnetic sensor 6, is arranged between these transducer elements 4, 5 in a recess, for example an elongate hole 11 in the first component 1. This galvanomagnetic sensor may take the form of a GMR sensor, as known from U.S. Pat. No. 6,081,759. Galvanomagnetic sensors or galvanomagnetic transducers are understood to mean sensors or transducers that under the influence of a magnetic field supply a signal that can be evaluated electronically or electrically. It is also possible to provide a transducer element (permanent magnet) only on the first component 1. Where two transducer elements 4, 5 in the form of permanent magnets are provided, these are so polarized that their magnetic fields have an intensified effect on the galvanomagnetic sensor 6. The galvanomagnetic sensor 6 is attached to a sensor holder 14. The sensor holder 14 is connected firmly with the second component 2 and may for example be of rod-shaped construction. The sensor holder 14 extends through an opening 13 in the plate 8. Another arrangement of the galvanomagnetic sensor 6 may also be provided in which the transducer elements 4, 5 or the one transducer element on the first component 1 influences the galvanomagnetic sensor 6 to produce a signal in the event of movement. The magnetic flux density with which the magnetic field acts on the galvanomagnetic sensor 6 changes in the event of relative movement between the transducer element or the two transducer elements 4, 5 and the galvanomagnetic sensor. As is known for example from U.S. Pat. No. 6,081,759, the measuring signal produced by the galvanomagnetic sensor 6, for example in the form of a change in resistance where a GMR sensor is used, may be converted into an electrical voltage signal in an evaluation device, not described in any more detail, for example in the form of a bridge circuit.

Other galvanomagnetic sensors may take the form of electrical conductors, for example coils, or of semiconductors, in particular those using the Hall effect. In such sensors too, an electrical signal is generated as a function of the change in a magnetic field or by movement of the conductor in a magnetic field.

In the exemplary embodiment the first component 1 is located in the upper position, shown by dash-dotted lines, if the plug-in tongue 15 is not inserted into the belt buckle. The seat belt buckle is then located for example in the park position. When the plug-in tongue 15 is inserted into the belt buckle 9, the first component 1 is brought into the lower position, shown with solid lines. When this happens, the magnetic field of the two transducer elements 4, 5 moves and/or changes at the position of the galvanomagnetic sensor 6. This movement or change in magnetic field is detected by the galvanomagnetic sensor 6 and the galvanomagnetic sensor 6 emits an appropriate signal, which corresponds to this movement. The signal may exhibit a particular amplitude and/or shape. This signal is evaluated as a switching signal and supplies information to the effect that the belt webbing part 16 has been connected with the belt buckle 9 by the plug-in tongue 15 and the seat belt has been put on. However, this movement may also be detected and the switching signal generated by an additional switch element, for example a reed contact, not described in any more detail. In the case of use with a seat belt, to produce the switching signal the first component is moved into the first positional zone upon insertion into the buckle of a plug-in tongue connected with the seat belt. The ejector or spring-loaded mandrel preferably has a corresponding extension or a corresponding attached piece, on which the transducer element, of which there is at least one, is provided especially in the form of a permanent magnet.

The switching signal is preferably evaluated such that information is produced thereby which states that the vehicle part has assumed a particular state and, in the case of a seat belt, whether or not the seat belt is being put on or removed by a vehicle occupant. The two components arranged so as to be movable relative to one another as well as the spring active between these two components in the second positional zone and the transducer are preferably arranged in the buckle of a seat belt.

The displacement of the two components relative to one another in the first positional zone is preferably unaffected by the force of the spring. In this first positional zone, the switching signal may be generated by a separate switch, for example by actuating a reed contact by a magnetic field. However, it is also possible for the switching signal to be produced by the transducer element that supplies the measuring signal.

If tension is exerted on the seat belt when the plug-in tongue 15 is in the inserted state, this tensile force is transmitted to the belt buckle 9 and in particular the frame located fixedly in the belt buckle 9, to which the two plates 7, 8 belong. In the event of tension starting from the seat belt webbing, the plates 7, 8, which are firmly connected to the seat belt webbing by the plug-in tongue 15 and the locking mechanism, not described in any more detail, of the belt buckle 9, are drawn upwards, in FIGS. 1 and 2, against the force of the spring 3. The first component 1, which is likewise firmly connected with the locking mechanism of the belt buckle 9, which locking mechanism effects locking of the plug-in tongue 15, is then also moved. The galvanomagnetic sensor 6 is fixed to the vehicle structure by the anchoring cable 9 and the second structural element in the form of an anchoring shoe 2. In the event of this movement, the guide pins 19 are displaced upwards in the elongate holes 10 in the direction of the upper defining edges. The magnetic field acting on the galvanomagnetic sensor 6 changes in particular with regard to its flux density, such that the galvanomagnetic sensor 6 supplies a measuring signal proportional to the movement distance and thus the tensile force. Within the possible movement distance, which is predetermined by the elongate holes 10, the spring constant of the spring 3 is preferably substantially rectilinear, such that information proportional to the tensile force and obtained from the measuring signal may be produced.

When the plug-in tongue 15 is released from the belt buckle 9, the first component 1 is brought back into its upper position, shown by broken lines. When this movement occurs, a switching signal is again generated, which indicates removal of the seat belt by the vehicle occupant.

It is clear from the above description that the two components 1, 2 assume two positional zones relative to one another, in which, in the first positional zone, the switching signal is generated without being influenced by the force of the spring 3 and, in the second positional zone, a measuring signal is generated if the two components 1, 2 are moved relative to one another against the force of the spring 3.

When the components are in the second positional zone, they are in such a position relative to one another that, when tensile force acts on the vehicle parts, the two components are moved relative to one another against the spring force, wherein one of the two components may assume stationary positioning. In the case of use in a seat belt buckle, the first component in the buckle is connected firmly with the seat belt, for example by locking of the plug-in tongue, while the second component in the belt buckle may be displaced in the belt buckle against the force of the spring by a tensile force acting on the belt webbing and is firmly anchored to the vehicle structure.

The transducer provided by the invention, which supplies both switching signals and measuring signals, may be used in a motor vehicle in those vehicle parts which are moved or adjusted into an operating position, for example a vehicle seat, and at which influences exerted by tensile forces are measured starting from this operating position. For example, the detected tensile forces may be evaluated to determine the severity of an accident, whereby the appropriate measures on the restraint device, such as for example degree of inflation of an airbag, adjustment of the belt force limiter and the like may then be effected.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A device for measuring tensile stress acting on a vehicle seat belt, comprising:

(a) a first component connected with the seat belt;

(b) a second component fixed to a structural component of a vehicle;

(c) a spring arranged between the two components, and against a force of said spring the two components movable relative to one another; and (d) a transducer having at least one transducer attached to at least one of the first and second components and produces electrical signals as a function of the positions of the first and second components relative to one another, wherein the transducer produces a switching signal when the components are in a first positional zone; and in a second positional zone, in which the two components movable relative to one another against the force of the spring, the transducer produces measuring signals proportional to the movement of the two components relative to one another, wherein the first and second components, the spring and the transducer are arranged in a belt buckle of the seat belt with the second component mounted in the belt buckle so as to be displaceable by a tensile force acting on a belt webbing of the seat belt when the first and second components are in the second positional zone.

2. The device for measuring tensile stress acting on a vehicle seat belt according to claim 1, wherein information about whether a seat belt has been put on or removed by a vehicle occupant is generated from the switching signal.

3. The device for measuring tensile stress acting on a vehicle seat belt according to claim 1, wherein the relative displacement of the two components is unaffected by the force of the spring in the first positional zone.

4. The device for measuring tensile stress acting on a vehicle seat belt according to claim 1, wherein the second component is firmly anchored to the vehicle structure and the belt buckle is moved against the force of the spring by a tensile force acting on the seat belt, thereby entailing a change in the magnetic field strength acting on the sensor.

5. The device for measuring tensile stress acting on a vehicle seat belt according to claim 1, wherein the transducer is a GMR sensor.

6. The device for measuring tensile stress acting on a vehicle seat belt according to claim 1, wherein at least one permanent magnet is fixed to one of the components as a transducer element and a galvanomagnetic sensor is fixed to the other component as a transducer element, said sensor generating a position-proportional electrical signal.

7. The device for measuring tensile stress acting on a vehicle seat belt according to claim 1, wherein at least one permanent magnet is fixed to one of the components as a transducer element and a galvanomagnetic sensor is fixed to the other component as a transducer element, said sensor generating a movement-proportional electrical signal.

8. The device for measuring tensile stress acting on a vehicle seat belt according to claim 1, wherein the first component is moved into the first positional zone when a plug-in tongue connected to the seat belt is inserted into the belt buckle.

9. The device for measuring tensile stress acting on a vehicle seat belt according to claim 8, wherein the first component is connected to the seat belt by the plug-in tongue locked into the belt buckle.

* * * * *